(12) United States Patent
Kim et al.

(10) Patent No.: US 9,728,997 B2
(45) Date of Patent: Aug. 8, 2017

(54) WIRELESS POWER TRANSMISSION SYSTEM

(75) Inventors: Sang Joon Kim, Seoul (KR); Ui Kun Kwon, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 207 days.

(21) Appl. No.: 13/613,497

(22) Filed: Sep. 13, 2012

(65) Prior Publication Data

US 2013/0069442 A1 Mar. 21, 2013

(30) Foreign Application Priority Data

Sep. 21, 2011 (KR) .................. 10-2011-0095223
Mar. 13, 2012 (KR) .................. 10-2012-0025310

(51) Int. Cl.
*H02J 17/00* (2006.01)
*H02J 7/02* (2016.01)
*H02J 5/00* (2016.01)
*H02J 50/12* (2016.01)

(52) U.S. Cl.
CPC .............. *H02J 7/025* (2013.01); *H02J 5/005* (2013.01); *H02J 17/00* (2013.01); *H02J 50/12* (2016.02)

(58) Field of Classification Search
USPC .................. 307/77, 31, 98, 104, 108, 126
See application file for complete search history.

(56) References Cited

U.S. PATENT DOCUMENTS

| 2009/0096413 A1* | 4/2009 | Partovi | H01F 5/003 320/108 |
| 2010/0007307 A1* | 1/2010 | Baarman | H02J 5/005 320/108 |
| 2010/0084918 A1* | 4/2010 | Fells | H02J 5/005 307/32 |
| 2011/0140542 A1 | 6/2011 | Kim et al. | |
| 2011/0159812 A1 | 6/2011 | Kim et al. | |
| 2011/0199046 A1* | 8/2011 | Tsai | H02J 7/025 320/108 |
| 2012/0049642 A1* | 3/2012 | Kim | H02J 5/005 307/104 |
| 2012/0056486 A1* | 3/2012 | Endo | H02J 17/00 307/104 |

FOREIGN PATENT DOCUMENTS

CN 102801218 A 11/2012
EP 2 528 185 A2 11/2012
(Continued)

OTHER PUBLICATIONS

Extended European Search Report issued on Jul. 15, 2014 in counterpart European Patent Applicaion No. 12184528.3 (3 pages in English).

(Continued)

*Primary Examiner* — Rexford Barnie
*Assistant Examiner* — Xuan Ly
(74) *Attorney, Agent, or Firm* — NSIP Law

(57) ABSTRACT

Provided is a device and method for wirelessly transmitting power, and a wireless power transmission device that may control an electrical connection between a power charger and a transmitter to charge a source resonator with power and transmit the charged power to a target resonator through mutual resonance.

23 Claims, 15 Drawing Sheets

(56) References Cited

FOREIGN PATENT DOCUMENTS

| | | |
|---|---|---|
| JP | 9-321652 A | 12/1997 |
| JP | 2006-191745 A | 7/2006 |
| JP | 2007-124628 A | 5/2007 |
| JP | 2007-523393 A | 8/2007 |
| JP | 2008-064762 A | 3/2008 |
| JP | 2008-147912 A | 6/2008 |
| JP | 2008-167259 A | 7/2008 |
| JP | 2009-135859 A | 6/2009 |
| KR | 10-2004-0018658 A | 3/2004 |
| KR | 10-2009-0119961 A | 11/2009 |

OTHER PUBLICATIONS

Chinese Office Action issued on Jun. 3, 2015, in counterpart Chinese Application No. 201210352318.7 (15 pages in English, 9 pages in Chinese).

Chinese Office Action issued on Jul. 22, 2016 in counterpart Chinese Application No. 201210352318.7 (27 Pages with English Translation).

Japanese Office Action issued on Mar. 15, 2016 in counterpart Japanese Application No. 2012-208593. (7 pages in Japanese with English Translation).

\* cited by examiner

ENERGY SENSING

ENVELOPE DETECTION

WIRELESS POWER TRANSMISSION SYSTEM

CROSS-REFERENCE TO RELATED APPLICATION(S)

This application claims the benefit under 35 U.S.C. §119 (a) of Korean Patent Application No. 10-2011-0095223, filed on Sep. 21, 2011, and No. 10-2012-0025310, filed on Mar. 13, 2012, in the Korean Intellectual Property Office, the entire disclosures of which are incorporated herein by reference for all purposes.

BACKGROUND

1. Field

The following description relates to an apparatus and method for wirelessly transmitting power.

2. Description of Related Art

Research into wireless power transmission has been conducted to address various issues including the limited capacity of a battery, an inconvenience of a wired power provision, and the like.

SUMMARY

In one general aspect, there is provided a wireless power transmission device, including a power charger configured to receive power from a power supply device, a transmitter comprising a source resonator, and a controller configured to control an electrical connection between the power charger and the transmitter to charge the source resonator with power and to transmit the charged power to a target resonator through a mutual resonance.

The source resonator may comprise at least one capacitor and one inductor.

The power charger may be configured to control an amount of current provided to the transmitter.

The power charger may comprise a variable resistor that is connected, in series, to the power supply device.

The controller may be configured to control the electrical connection between the power charger and the transmitter based on an amount of power that the source resonator is charged with.

The controller may be configured to turn on a switch that electrically connects the power charger and the transmitter to charge the source resonator with power, and turn off the switch that electrically connects the power charger and the transmitter to transmit power the source resonator is charged with.

The controller may be configured to control an electrical connection between the power supply device and the source resonator to prevent current from being provided to the source resonator from the power supply device while the source resonator is transmitting power to the target resonator through mutual resonance.

The power charger may comprise a plurality of resistors connected, in parallel, to the power supply device.

The controller may be configured to open the electrical connection between the power charger and the transmitter, in response to the source resonator receiving a predetermined amount of power from the power supply device.

The wireless power transmission device may further comprise a measuring unit configured to measure a voltage applied to a capacitor of the source resonator and a current applied to an inductor of the source resonator, and a calculator configured to calculate energy stored in the source resonator based on the measured voltage and the measured current.

The wireless power transmission device may further comprise a measuring unit configured to measure a voltage applied to a capacitor of the source resonator, and a detector configured to detect an envelope of a voltage applied to a capacitor of the source resonator based on the measured voltage.

In another aspect, there is provided a wireless power reception device, including a charger comprising a target resonator, a power output unit configured to transfer power to a load, and a controller configured to control an electrical connection between the charger and the power output unit to charge the target resonator with power through mutual resonance with a source resonator, and to deliver the charged power to the load.

The target resonator may comprise at least one capacitor and one inductor.

The power output unit may deliver power that the at least one capacitor and one inductor are charged with, to the load.

The wireless power reception device of claim 12, wherein the controller is configured to control the electrical connection between the charger and the power output unit based on an amount of power that the target resonator is charged with.

The controller may be configured to turn off a switch that electrically connects the charger and the power output unit OFF while charging the target resonator with power, and turn off the switch that electrically connects the charger and the power output unit to deliver, to the load, power that the target resonator is charged with.

The controller may be configured to control an electrical connection between the target resonator and the load to prevent power from being delivered to the load from the target resonator while charging the target resonator through mutual resonance with the source resonator.

The power output unit may comprise a capacitor to change a resonant frequency of the target resonator in response to being electrically connected to the target resonator.

The wireless power reception device may further comprise a measuring unit configured to measure a voltage applied to a capacitor of the target resonator and a current applied to an inductor of the target resonator, and a calculator configured to calculate energy stored in the target resonator based on the measured voltage and the measured current.

The wireless power reception device may further comprise a measuring unit configured to measure a voltage applied to a capacitor of the target resonator, and a detector configured to detect an envelope of a voltage applied to a capacitor of the target resonator based on the measured voltage.

The load may comprise a battery.

In another aspect, there is provided a wireless power transmission system, including a wireless power transmission device comprising a power supply device, a source resonator, and a first controller that controls an electrical connection between the power supply device and the source resonator to charge the source resonator with power and to transmit the charged power, and a wireless power reception device comprising a load, a target resonator that receives power transmitted from the source resonator through mutual resonance, and a second controller that controls an electrical connection between the target resonator and the load to deliver the received power to the load.

The source resonator and the target resonator may each comprise at least one capacitor and one inductor.

In another aspect, there is provided a method of transmitting wireless power, the method including charging a source resonator with power provided from a power supply device through a current, controlling an electrical connection between the power supply device and the source resonator, and transmitting, to a target resonator, the charged power through mutual resonance.

The source resonator may comprise at least one capacitor and one inductor.

The charging may comprises adjusting an amount of current provided to the source resonator.

The controlling may comprise controlling an electrical connection between the power supply device and the source resonator based on an amount of power the source resonator is charged with.

The method may further comprise detecting an envelope of a voltage applied to a capacitor of the source resonator.

In another aspect, there is provided a method of receiving wireless power, the method including charging a target resonator with power that a source resonator is charged with, through mutual resonance between a source resonator and the target resonator, and delivering, to a load, the power that the target resonator is charged with.

The target resonator may comprise at least one capacitor and one inductor.

The delivering may comprise delivering, to the load, power the at least one capacitor and one inductor are charged with.

The method may further comprise controlling an electrical connection between the target resonator and the load based on an amount of power that the target resonator is charged with.

The method may further comprise changing a resonant frequency of the target resonator using a capacitor that is additionally connected to the target resonator.

The method may further comprise detecting an envelope of a voltage applied to a capacitor of the target resonator.

Other features and aspects will be apparent from the following detailed description, the drawings, and the claims.

Figure 1:
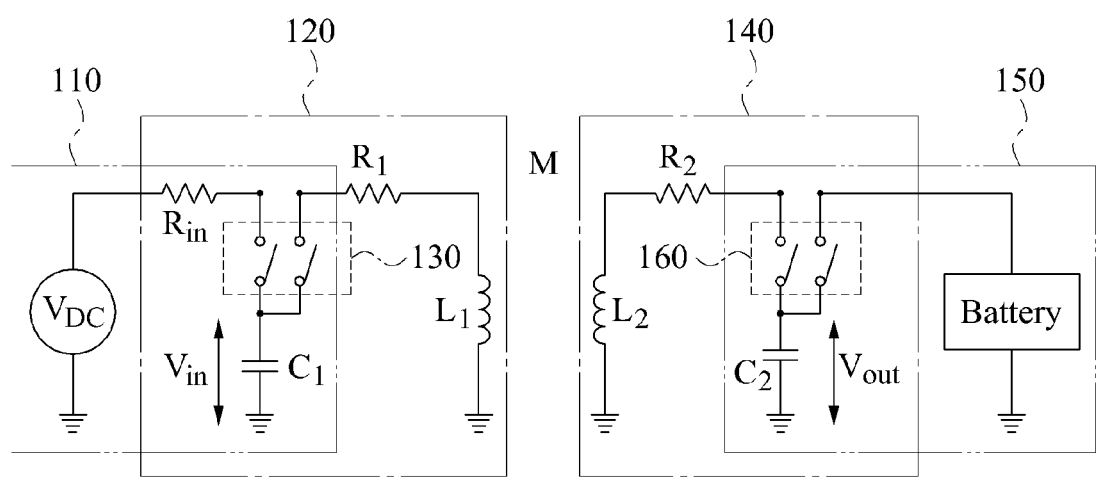
FIG. 1 is a diagram illustrating an example of an equivalent circuit of a near-field wireless power transmission system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, description of well-known functions and constructions may be omitted for increased clarity and conciseness.

A wireless power transmission system may be applied to various systems that use wireless power transmission. For example, a mobile phone, a wireless television (TV), a tablet, a sensor, an appliance, and the like may be powered using wireless power transmission. As another example, wireless power transmission system may be applied to a bio-healthcare field, and thus, may be used for remotely transmitting power to a device inserted into a body, or for wirelessly transmitting power to a bandage-type device for measuring a bio-signal such as a heartbeat.

As another example, a wireless power transmission system may be applied to a remote control of an information storage device excluding a power source. The communication system may remotely provide power for driving a device to the information storage device, and for wirelessly loading information stored in the information storage device.

The target device described herein is a device that may receive power wirelessly, for example, a terminal, a smart phone, a television, an appliance, a tablet, a computer, a sensor, and the like. The source device described herein is a device that may wirelessly supply power to one or more target devices.

FIG. 1 illustrates an example of an equivalent circuit of a near-field wireless power transmission system. In this example, a power input unit 110 and a power transmission unit 120 are physically isolated by a capacitor $C_1$ and a switch unit 130, and a receiver 140 and a power output unit 150 are physically isolated by a capacitor $C_2$ and a switch unit 160.

Referring to FIG. 1, the wireless power transmission system corresponds to a source-target configuration in which a source may wirelessly transmit power to a target. That is, the wireless power transmission system may include a wireless power transmission device corresponding to a source and a wireless power reception device corresponding to a target.

In this example, the wireless power transmission device includes the power input unit 110, the power transmission unit 120, and the switch unit 130. The power input unit 110 may store energy in the capacitor $C_1$ using a power supply device. The switch unit 130 may connect the capacitor $C_1$ to the power input unit 110 so that energy may be stored in the capacitor $C_1$, and may disconnect the capacitor $C_1$ from the power input unit 110, so that the capacitor $C_1$ may be connected to the power transmission unit 120 so that energy stored in the capacitor $C_1$ is discharged. The switch unit 130 may prevent the capacitor $C_1$ from being simultaneously connected to the power input unit 110 and the power transmission unit 120.

The power transmission unit 120 may transfer electromagnetic energy to a receiver 140. For example, a transmission coil $L_1$ of the power transmission unit 120 may transfer power through a mutual resonance with a reception coil $L_2$ of the receiver 140. A level of the mutual resonance that occurs between the transmission coil $L_1$ and reception coil $L_2$ may be determined by a mutual inductance M.

In this example, the power input unit 110 includes an input voltage $V_{DC}$, an internal resistance $R_{in}$, and a capacitor $C_1$, the power transmission unit 120 includes basic circuit elements $R_1$, $L_1$, and $C_1$ which reflect a physical property corresponding to the power transmission unit 120, and the switch unit 130 includes a plurality of switches. An active device may be used as a switch to perform an on and an off function. Here, R denotes a resistance component, L denotes an inductance component, and C denotes a capacitance component. A voltage across the capacitor $C_1$ corresponding to a portion of the input voltage $V_{DC}$ is indicated by $V_{in}$.

The wireless power reception device includes the receiver 140, the power output unit 150, and the switch unit 160. The receiver 140 may receive electromagnetic energy from the power transmission unit 120. The receiver 140 may store received electromagnetic energy in a connected capacitor. The switch unit 160 may connect the capacitor $C_2$ to the receiver 140 so that energy may be stored in the capacitor $C_2$, and may disconnect the capacitor $C_2$ from the receiver 140 so that the capacitor $C_2$ may be connected to the power output unit 150 so that energy stored in the capacitor $C_2$ may be delivered to a load. The switch unit 160 may prevent the capacitor $C_2$ from being simultaneously connected to the receiver 140 and the power output unit 150.

A reception coil $L_2$ of the receiver 140 may receive power through mutual resonance with the transmission coil $L_1$ of the power transmission unit 120. The capacitor $C_2$ connected to the reception coil $L_2$ may be charged with the received power. The power output unit 150 may deliver the power charged in the capacitor $C_2$ to a battery. As another example, the power output unit 150 may deliver power to a load or a target device instead of the battery.

The receiver 140 includes circuit elements $R_2$, $L_2$, and $C_2$ reflecting a physical property corresponding to the receiver 140, the power output unit 150 includes the capacitor $C_2$ and the battery, and the switch unit 160 includes a plurality of switches. A voltage across the capacitor $C_2$ corresponding to a portion of the energy received by the reception coil $L_2$ is indicated by $V_{out}$.

As described in the foregoing, a resonator isolation (RI) system for transmitting power by physically isolating the power input unit 110 and the power transmission unit 120, and the receiver 140 and the power output unit 150 may have improvements when compared to a conventional scheme using an impedance matching. For example, a power amplifier may not be needed because power may be supplied directly from a direct current (DC) source to a source resonator. Rectification through a rectifier may not be needed because energy is captured from power stored in a capacitor at a reception end. Transmission efficiency may not be responsive to a change in a distance between a transmission end and a reception end because impedance matching may not be used. The example RI system may be easily extended to a communication system that uses wireless power and includes a plurality of transmission ends and a plurality of reception ends.

Figure 2A:
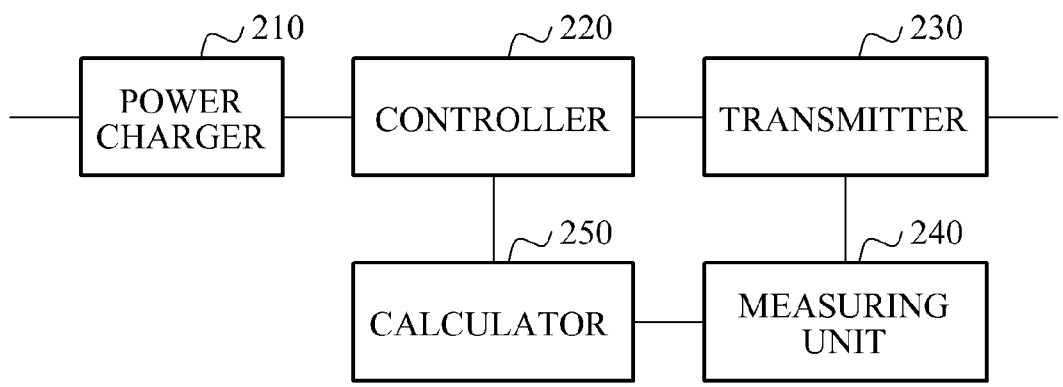
FIGS. 2A and 2B are diagrams illustrating examples of a wireless power transmission device.
Figure 2B:
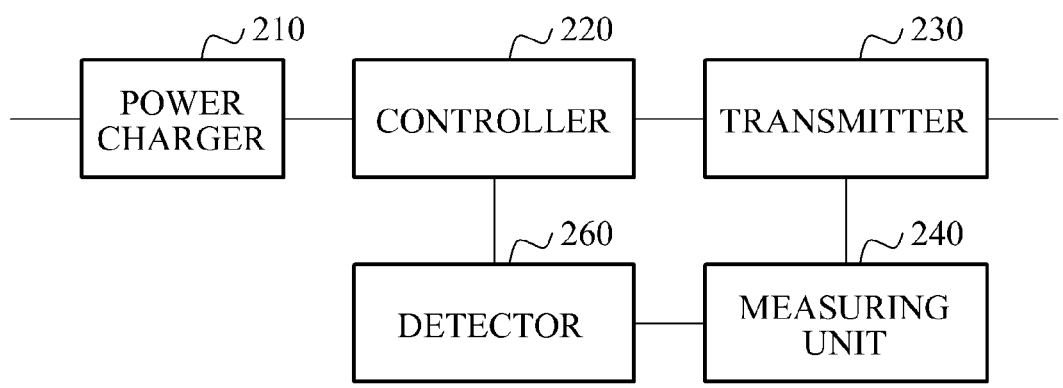

FIGS. 2A and 2B illustrate examples of a wireless power transmission device.

Referring to FIG. 2A, the wireless power transmission device includes a power charger 210, a controller 220, a transmitter 230, a measuring unit 240, and a calculator 250.

The power charger 210 may charge a source resonator with power provided from a power supply device. The power supply device may be included in the power charger 210, or may be disposed outside of the power charger 210. The power charger 210 may charge the source resonator with power provided from a DC power supply device or an alternate current (AC) power supply device. In some examples, the power charger 210 may more easily charge the source resonator with power using the DC power supply device. However, if the AC power supply device is used, the power charger 210 may charge the source resonator with power through an adequate timing control, by adding a switch or by converting a power to a DC power using an AC-DC converter.

The source resonator may include at least one capacitor and inductor. In this example, the power charger 210 may charge the inductor with power provided from the power supply device through a current. An amount of energy to be stored in the inductor may be determined by an inductance. A Quality (Q) value of a resonator may be proportional to a magnitude of the inductance. For example, as the inductance increases, an amount of energy stored in the source resonator may increase, and the Q value of the source resonator may also increase. The wireless power transmission device may control an amount of power to be transmitted and control the Q value by adjusting the inductance of the inductor.

The power charger 210 may quantize a level of power that the inductor is charged with by adjusting an amount of current provided from the power supply device. The amount of power that the inductor is charged with may be determined based on an amount of current provided to the inductor. For example, the power charger 210 may vary the level of power the inductor is charged with by adjusting an amount of current provided during a predetermined period of time. An amount of quantized power may be used for transmitting data.

The power charger 210 may adjust an amount of current provided from the power supply device using a variable resistor connected to the power supply device in series. A magnitude of current provided to the inductor may vary based on a magnitude of a variable resistance. Thus, the power charger 210 may vary the level of power that the inductor is charged with, using the variable resistor.

Rather than using the variable resistor connected in series, the power charger 210 may use a plurality of resistors that are connected to the power supply device in parallel and switches connected to each of the plurality of resistors in series to adjust the amount of current provided from the power supply device. In this example, an effective resistance of the resistors between the power supply device and the source resonator may be determined according to a connection of the switch. An amount of current provided from the power supply device to the source resonator may be determined based on the effective resistance.

The controller 220 may control an electrical connection between the power charger 210 and the transmitter 230. For example, to control the electrical connection between the power charger 210 and the transmitter 230, the controller 220 may turn a switch on and off. In this example, various types of electrical and mechanical switches may be used as the switch.

As another example, the controller 220 may control the electrical connection between the power charger 210 and the transmitter 230 based on an amount of power the source resonator is charged with. For example, the controller 220 may electrically disconnect the power charger 210 from the transmitter 230 if the amount of power the source resonator is charged with has a peak value. If a sufficient period of time passes after a current is applied to an inductor of the source resonator from the power supply device, the inductor may reach a steady state. In this instance, the controller 220 may electrically disconnect the power charger 210 from the transmitter 230. As an example, if a value of current flowing through the inductor has a predetermined value over time, the controller 220 may determine that the inductor reaches a steady state.

The measuring unit 240 may measure a voltage applied to a capacitor of the source resonator and a current applied to an inductor of the source resonator. The calculator 250 may calculate the energy stored in the source resonator based on the measured voltage and/or the measured current. The controller 220 may control an electrical connection between the power charger 210 and the transmitter 230 based on the calculated energy.

For example, the controller 220 may turn on a switch that electrically connects the power charger 210 and the transmitter 230 so as to charge the source resonator with power. The controller 220 may turn off the switch that electrically connects the power charger 210 and the transmitter 230 so as to transmit power the source resonator is charged with. While the source resonator is transmitting power to a target resonator, the controller 220 may open an electrical connection between the power supply device and the source resonator so as to prevent a current from being provided to the source resonator from the power supply device. The controller 220 may turn on a switch that connects the power supply device and the source resonator when charging the source resonator with power, and may turn the switch off that connects the power supply device and the source resonator when the source resonator is charged with a predetermined value of power.

The controller 220 may open the electrical connection between the power charger 210 and the transmitter 230 if the source resonator reaches a steady state due to being provided with a sufficient amount of power from the power supply device. Here, the electrical connection being opened may refer to a switch being turned off.

The transmitter 230 may transmit power that the source resonator is charged with, to the target resonator through mutual resonance between the source resonator and the target resonator. For example, if the electrical connection between the power charger 210 and the transmitter 230 opens after the source resonator is charged with power, the source resonator may start to resonate due to a self characteristic. Energy stored in the source resonator may be delivered to the target resonator through mutual resonance between the source resonator and the target resonator. A degree of the mutual resonance may be determined by a mutual inductance M.

An amount of energy to be stored in the inductor may be proportional to a capacity of the inductor, that is, an inductance, and a Q value of the source resonator may be proportional to the inductance. Thus, the wireless power transmission device may use a scheme of charging the source resonator with power by applying a current to the inductor, thereby maintaining a relatively great Q value for the source resonator while increasing an amount of power to be transmitted from the source resonator. Further, a decrease in transmission efficiency due to a switch being closed may be prevented by disconnecting the power charger 210 from the transmitter 230, by opening the switch while discharging power from the source resonator to the target resonator.

Referring to FIG. 2B, the wireless power transmission device may include a detector 260 instead of the calculator 250 of FIG. 2A.

In this example, the detector 260 may detect an envelope of a voltage applied to a capacitor of the source resonator based on a voltage measured by the measuring unit 240. For example, the detector 260 may detect the envelope by removing a resonant frequency component from a waveform of a voltage applied to the capacitor of the source resonator. The detector 260 may estimate a level of energy the source resonator is charged with based on the detected envelope.

If an amplitude of the envelope is less than or equal to a predetermined value, the controller 220 may turn a switch off or on so as to control the electrical connection between the power charger 210 and the transmitter 230.

Figure 3A:
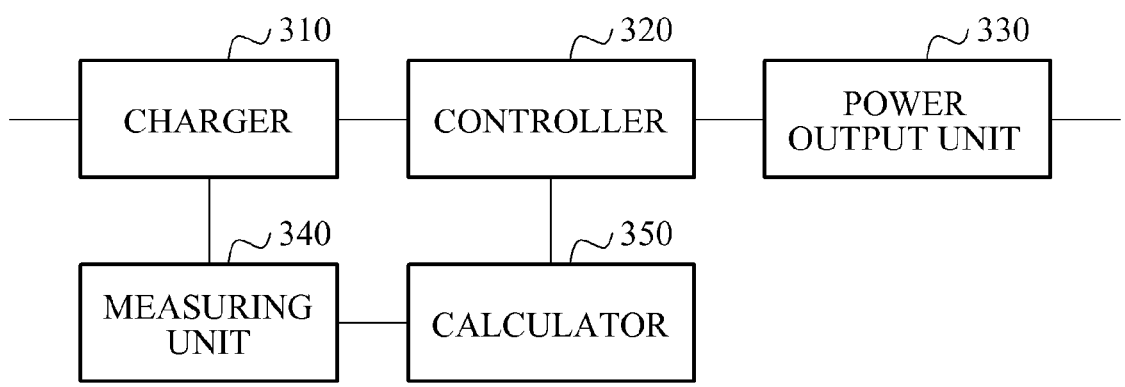
FIGS. 3A and 3B are diagrams illustrating examples of a wireless power reception device.
Figure 3B:
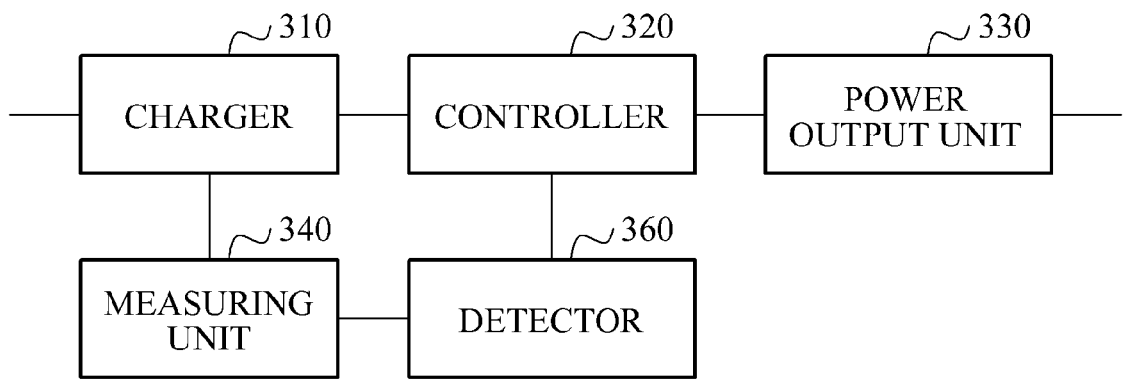

FIGS. 3A and 3B illustrate examples of a wireless power reception device.

Referring to FIG. 3A, a wireless power reception device includes a charger 310, a controller 320, a power output unit 330, a measuring unit 340, and a calculator 350.

The charger 310 may charge a target resonator with energy that is stored in a source resonator through mutual resonance between the source resonator and the target resonator. Power the target resonator is charged with may correspond to power the source resonator is charged with and which is delivered through mutual resonance. The target resonator may include at least one capacitor and one inductor. The charger 310 may charge the at least one capacitor and one inductor through mutual resonance between the source resonator and the target resonator. The mutual resonance may be affected by a mutual inductance between the source resonator and the target resonator. That is, an occurrence of the mutual resonance may be more likely if there exists a relatively high value of the mutual inductance.

The controller 320 may control an electrical connection between the charger 310 and the power output unit 330. For example, the controller 320 may turn a switch on and off to control the electrical connection between the charger 310 and the power output unit 330. The controller 320 may control the electrical connection between the charger 310 and the power output unit 330 based on an amount of power the target resonator is charged with.

While the target resonator is being charged through mutual resonance between the source resonator and the target resonator, the controller 320 may open an electrical connection between the target resonator and a load to prevent power from being delivered from the target resonator to the load. For example, while the target resonator is being charged, the controller 320 may physically isolate the target resonator and the load by turning a switch off that electrically connects the charger 310 and the power output unit 330. To deliver the power the target resonator is charged with to the load, the controller 320 may turn the switch on that electrically connects the charger 310 and the power output unit 330.

The controller 320 may control a charge of the target resonator. In this example, a resonant frequency of the target resonator may be determined by a capacitor and an inductor of the target resonator. The controller 320 may change the resonant frequency of the target resonator by additionally connecting a capacitor to the target resonator. In response to the resonant frequency of the target resonator being changed, a mutual resonance between the source resonator and the target resonator may cease or may be reduced. In response to a cease in the mutual resonance, the charger 310 may cease charging the target resonator.

If an amount of power the target resonator is charged with is greater than or equal to a predetermined value, the controller 320 may stop charging the target resonator by connecting an additional capacitor to the target resonator so as to change a resonant frequency. For example, the predetermined value may correspond to a peak value of energy to be stored in the target resonator. The predetermined value may be determined based on a charge capacity of the load.

The power output unit 330 may deliver the power the target resonator is charged with to the load. As an example, the load may be a device using power, which may be a target device expending power or may be a device storing power, for example, a battery. If an amount of power the target resonator is charged with is greater than or equal to a predetermined value, and the target resonator and the load are electrically connected, the power the target resonator is charged with may be delivered to the load. In this example, the target resonator may be additionally connected to a capacitor, as described in the foregoing, along with the load. Accordingly, if power starts to be delivered to the load and a resonant frequency of the target resonator changes, the target resonator may stop being charged, and the charged power may not be retransmitted to the source resonator through a mutual resonance. The power output unit 330 may deliver power the target resonator is charged with to the load, according to a charging requirement of the load. For example, the charging requirement of the load may correspond to a rated voltage and a rated current.

The measuring unit 340 may measure a voltage applied to a capacitor of the target resonator, and a current applied to an inductor of the target resonator. The calculator 350 may calculate energy stored in the target resonator based on the measured voltage and the measured current. For example, the controller 320 may control an electrical connection between the charger 310 and the power output unit 330 based on the energy stored in the target resonator. For example, if the energy stored in the target resonator has a value less than or equal to a predetermined value, the controller 320 may turn a switch off so that the charger 310 and the power output unit 330 are not electrically connected.

Referring to FIG. 3B, the wireless power reception device includes a detector 360 instead of the calculator 350 of FIG. 3A.

In this example, the detector 360 may detect an envelope of a voltage applied to a capacitor of the target resonator based on a voltage measured by the measuring unit 340. For example, the detector 360 may detect the envelope by removing a resonant frequency component from a waveform of the voltage applied to the capacitor of the target resonator. The detector 360 may estimate a level of energy the target resonator is charged with, based on the detected envelope.

If the envelope has a peak value, the controller 320 may turn a switch on to electrically connect the charger 310 and the power output unit 330. If an amplitude of the envelope is less than or equal to a predetermined value, the controller 320 may turn a switch OFF to prevent the charger 310 and the power output unit 330 from being electrically connected.

Figure 4:
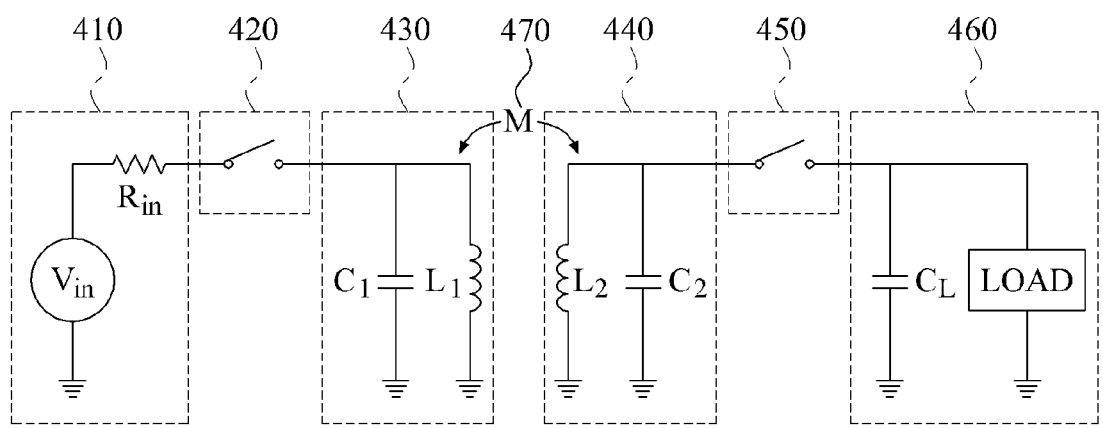
FIG. 4 is a diagram illustrating an example equivalent circuit of a wireless power transmission system.

FIG. 4 illustrates an example of an equivalent circuit of a wireless power transmission system.

Referring to FIG. 4, a wireless power transmission device includes a power charger 410, a controller 420, and a transmitter 430. The power charger 410 includes a power supply device $V_{in}$ and a resistor $R_{in}$. A source resonator includes a capacitor $C_1$ and an inductor $L_1$. The transmitter 430 may transmit energy that is stored in the source resonator through mutual resonance between the source resonator and a target resonator. For example, the controller 420 may turn the switch on to provide power from the power charger 410 to the source resonator. The power supply device $V_{in}$ may apply a voltage to the capacitor $C_1$, and may apply a current to the inductor $L_1$. In response to the wireless power transmission device reaching a steady state, a voltage applied to the capacitor $C_1$ may become "0," and a current flowing through the inductor $L_1$ may have a value of $V_{in}/R_{in}$. At the steady state, the inductor $L_1$ may be charged through the applied current.

In response to power stored in the source resonator reaching a predetermined value at the steady state, the controller 420 may isolate the power charger 410 and the transmitter 430 by turning the switch off. The source resonator may initiate a self-resonance between the capacitor $C_1$ and the inductor $L_1$, and energy stored in the source resonator may be delivered to the target resonator through mutual inductance M 470. In this example, a resonant frequency $f_1$ of the source resonator may be equal to a resonant frequency $f_2$ of the target resonator as shown in Equation 1.

$$f_1 = \frac{1}{2\pi\sqrt{L_1 C_1}},$$
$$f_2 = \frac{1}{2\pi\sqrt{L_2 C_2}}$$
$$f_1 = f_2$$

Equation (1)

The wireless power reception device includes the charger 440, a controller 450, and the power output unit 460. The target resonator includes a capacitor $C_2$ and an inductor $L_2$. While mutual resonance occurs between the source resonator and the target resonator, the source resonator may be isolated from the power supply device $V_{in}$, and the target resonator may be isolated from a load and a capacitor $C_L$. The capacitor $C_2$ and the inductor $L_2$ of the target resonator may be charged through a mutual resonance.

For example, the controller 450 may turn a switch off to charge the target resonator. While the switch is off, a resonant frequency of the source resonator may be equal to a resonant frequency of the target resonator, and a mutual resonance may occur. In response to power charged in the target resonator reaching a predetermined value, the controller 450 may turn the switch on. Information of the predetermined value may be set in the controller 450. If the switch is turned on, the capacitor $C_L$ may be connected to the target resonator, and a resonant frequency of the target resonator may change as shown in Equation 2.

$$f_2' = \frac{1}{2\pi\sqrt{L_2(C_2 + C_L)}}$$

Equation (2)

Thus, the mutual resonance between the source resonator and the target resonator may be terminated. When $f_2'$ is sufficiently small when compared to $f_2$, in consideration of Quality (Q) factor of the target resonator, a mutual resonant channel may cease to exist. The power output unit 460 may deliver power stored in the capacitor $C_2$ and the inductor $L_2$ to the load. The power output unit 460 may deliver power in a scheme appropriate for the load.

The controller 450 may turn the switch off if the power charged in the target resonator has a value less than a predetermined value. The charger 440 may charge the target resonator through mutual resonance between the source resonator and the target resonator.

Figure 5:
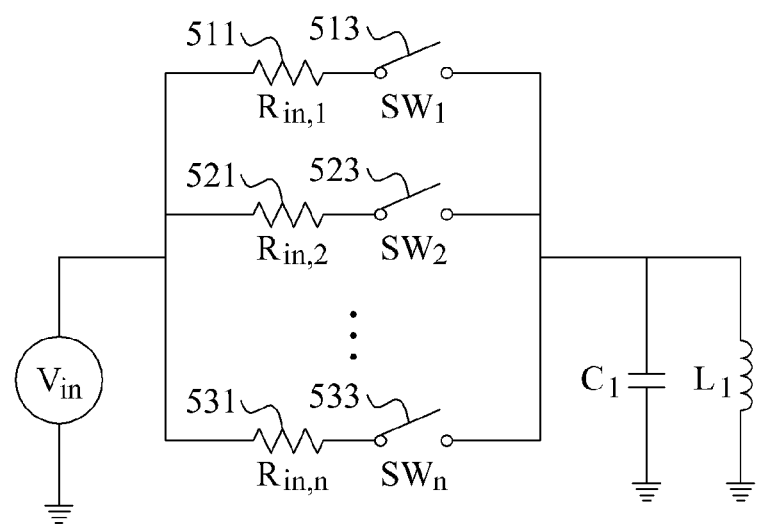
FIG. 5 is a diagram illustrating an example of a parallel pair in a wireless power transmission device.

FIG. 5 illustrates an example of a parallel pair in a wireless power transmission device. Referring to FIG. 5, the parallel pair is disposed between a power supply device $V_{in}$, and a capacitor $C_1$ (or an inductor $L_1$). In this example, a pair includes a resistor and a switch. An arrangement in which pairs are connected to each other in parallel is referred to as the parallel pair.

Pair 1 includes a resistor $R_{in,1}$ 511 and a switch $SW_1$ 513. Pair 2 includes a resistor $R_{in,2}$ 521 and a switch $SW_2$ 523. Pair n includes a resistor $R_{in,n}$ 531 and a switch $SW_n$ 533. A resistance between the power supply device $V_{in}$ and the capacitor $C_1$ (or the inductor $L_1$) may be determined depending on which switch from among the switch $SW_1$ 513, the switch $SW_2$ 523, and the switch $SW_n$ 533 is turned on. An amount of current applied to the inductor $L_1$ may be determined depending on the determined resistance. Thus, the amount of current applied to the inductor $L_1$ may be adjusted by controlling the switch $SW_1$ 513, the switch $SW_2$ 523, and the switch $SW_n$ 533 from being turned on and off.

An amount of current input to a source resonator may be adjusted by an independent operation of the respective switch. For example, if switches corresponding to $S \subseteq \{1, \ldots, n\}$ are turned on, an amount of current $i_s$ input to the source resonator may be evaluated as the following equation.

$$i_S = V_{in} \sum_{i \in S} \frac{1}{R_{in,j}}$$

Using the parallel pair, the wireless power transmission device may adjust the amount of current up to a maximum of $2^n$. Various levels of the amount of current may be used for transmitting data as well as for transmitting energy. For example, if a maximum permissible amount of current for a switch of each pair is insufficient, the wireless power transmission device may increase an amount of current input using the parallel pair. For example, if the maximum permissible amount of current for a switch corresponds to 300 milliamperes (mA), and a maximum amount of charging current used for the source resonator corresponds to 1.2 amperes (A), the wireless power transmission device may increase the amount of input current by the maximum amount of charging current by connecting the same type of four switches in parallel.

Figure 6:
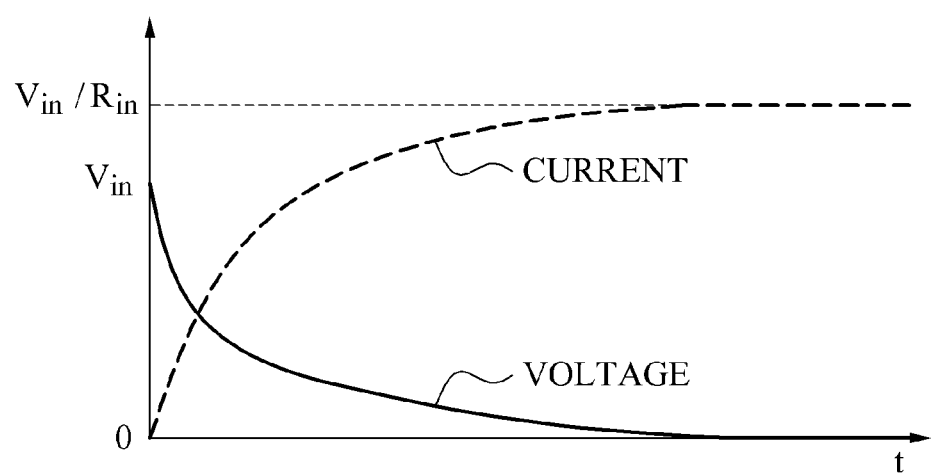
FIG. 6 is a graph illustrating an example of a current and a voltage applied to an inductor of a source resonator in a wireless power transmission device.

FIG. 6 illustrates an example of a current and a voltage applied to an inductor of a source resonator in a wireless power transmission device. A graph of FIG. 6 illustrates an example of a current and a voltage applied to the inductor when a power supply device is connected to the source resonator.

A point in time at which a switch connecting the source resonator and the power supply device is turned on may correspond to "0" on a time axis. In response to the switch being turned on, a voltage $V_{in}$ supplied from the power supply device may be applied to the inductor, in full. A voltage applied to the inductor may decrease, and a current applied to the inductor may increase over time. If the inductor reaches a steady state, the current applied to the inductor may have a constant value at $V_{in}/R_{in}$. If energy stored in the inductor reaches a predetermined value, the wireless power transmission device may induce mutual resonance between the source resonator and a target resonator by turning the switch off.

Figure 7:
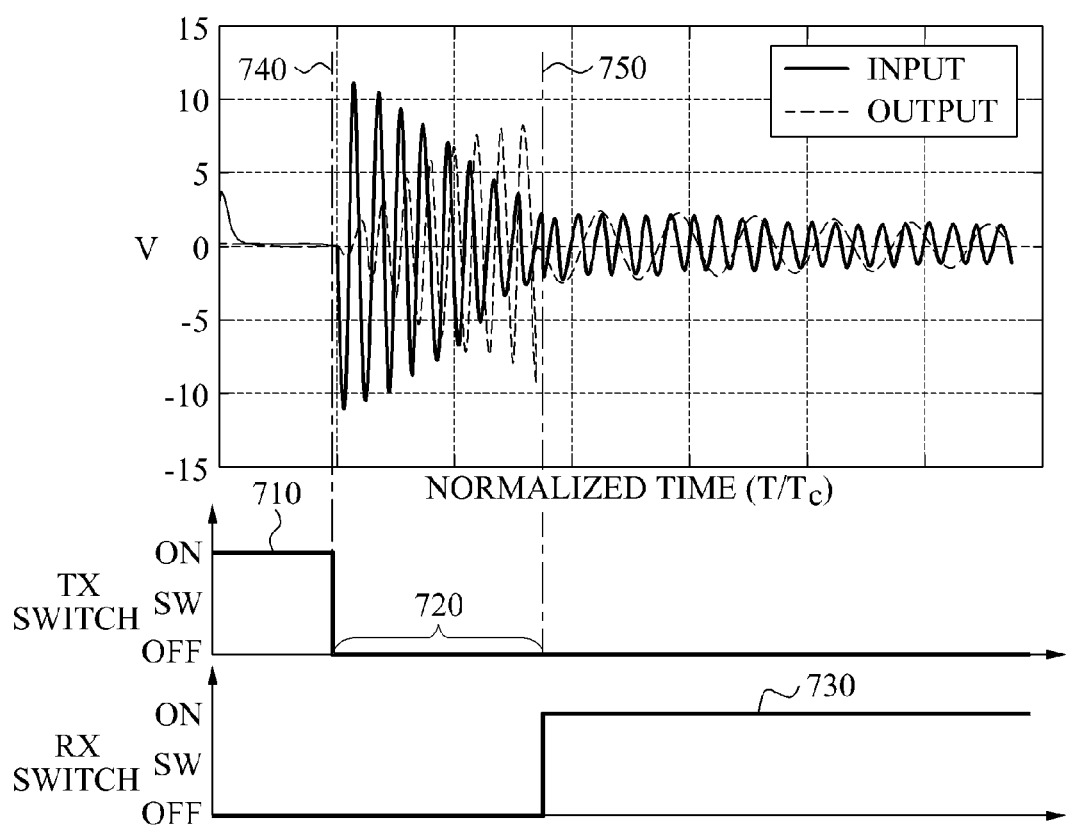
FIG. 7 is a graph illustrating an example of a delivery of energy according to a mutual resonance between a source resonator and a target resonator in a wireless power transmission system.

FIG. 7 illustrates an example of a delivery of energy by mutual resonance between a source resonator and a target resonator in a wireless power transmission system. The example of FIG. 7 corresponds to a graph illustrating that a wireless power reception device captures energy stored in the target resonator by a switch operation. Referring to FIG. 7, a solid line labeled Input depicts energy transmitted from the source resonator, and a dotted line labeled Output depicts energy received by the target resonator.

While a transmission (TX) switch connecting a power supply device and the source resonator in the wireless power transmission device is turned on during a time interval 710, the source resonator may be charged with power. In this example, the source resonator is charged with a current applied to an inductor. At a point in time 740 when the TX switch is turned off, mutual resonance may occur between the source resonator and the target resonator. To generate mutual resonance, a reception (RX) switch connecting the target resonator and a load in the wireless power reception device may maintain an off state during a time interval 720 in which the TX switch is turned off.

At a point in time 750 when the RX switch is turned on, a capacitor may be additionally connected to the target resonator, and thus, a resonant frequency may change. In this example, a mutual resonance between the source resonator and the target resonator may be terminated. During a time interval 730 in which the RX switch is turned on, the energy stored in the target resonator may not be retransmitted to the source resonator, and may be delivered to the load. The wireless power reception device may turn the RX switch on at an instant when a maximum or desired amount of energy is stored in the target resonator, thereby capturing the energy that is stored in the target resonator. The wireless power reception device may detect an envelope of a voltage applied to the inductor, and may turn the RX switch on at a point in time when the envelope is at a maximum.

Figure 8A:
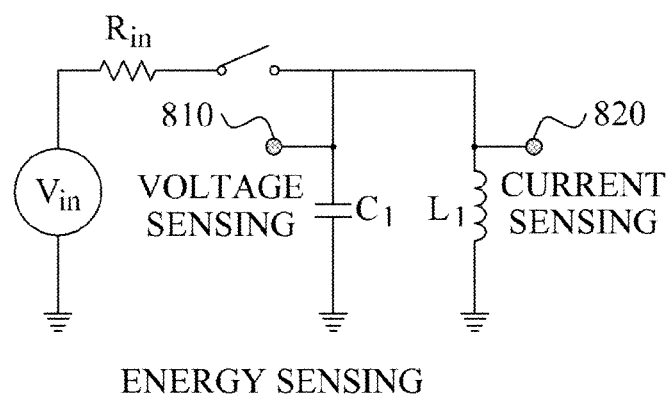
FIGS. 8A and 8B are diagrams illustrating examples of sensing a voltage and a current, and detecting an envelope in a wireless power transmission system.
Figure 8B:
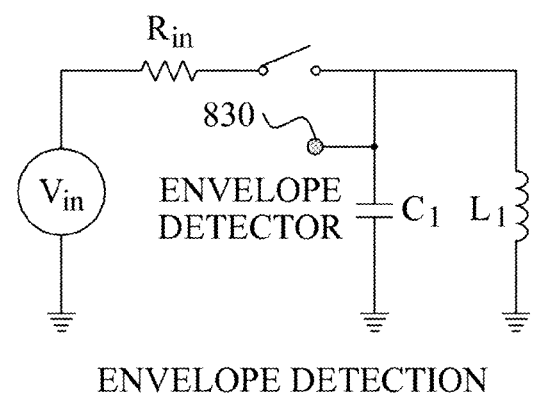

FIGS. 8A and 8B illustrate examples of sensing a voltage and a current, and detecting an envelope in a wireless power transmission system.

Referring to FIG. 8A, a wireless power transmission device senses a voltage applied to a capacitor $C_1$ in 810, and senses a current applied to an inductor $L_1$ in 820, thereby calculating energy stored in a source resonator. The energy stored in the source resonator may be expressed as the following Equation 3.

$$E = \frac{1}{2}C_1 V^2 + \frac{1}{2}L_1 I^2 \qquad \text{Equation (3)}$$

The wireless power transmission device may calculate energy stored in the source resonator based on the sensed voltage and the sensed current.

Referring to FIG. 8B, the wireless power transmission device detects an envelope of a voltage applied to a capacitor $C_1$ in 830, and estimates a level of energy stored in the source resonator. The wireless power transmission device may remove a resonant frequency component from the voltage applied to the capacitor $C_1$, and detect an envelope, to estimate the level of energy stored in the source resonator more easily. The wireless power transmission device may turn a switch off that connects a power supply device and the source resonator if the envelope has a peak value.

Although not illustrated, a wireless power reception device may recognize energy stored in a target resonator using a scheme of FIG. 8A or FIG. 8B. The wireless power reception device may sense a voltage a capacitor of the target resonator is charged with and a current and an inductor of the target resonator is charged with, and may calculate energy stored in the target resonator based on the sensed voltage and the sensed current. The wireless power reception device may detect an envelope of a voltage applied to a capacitor of the target resonator, to estimate a level of energy stored in the target resonator. The wireless power reception device may turn a switch on that connects the target resonator and a load if the envelope has a peak value.

Figure 9:
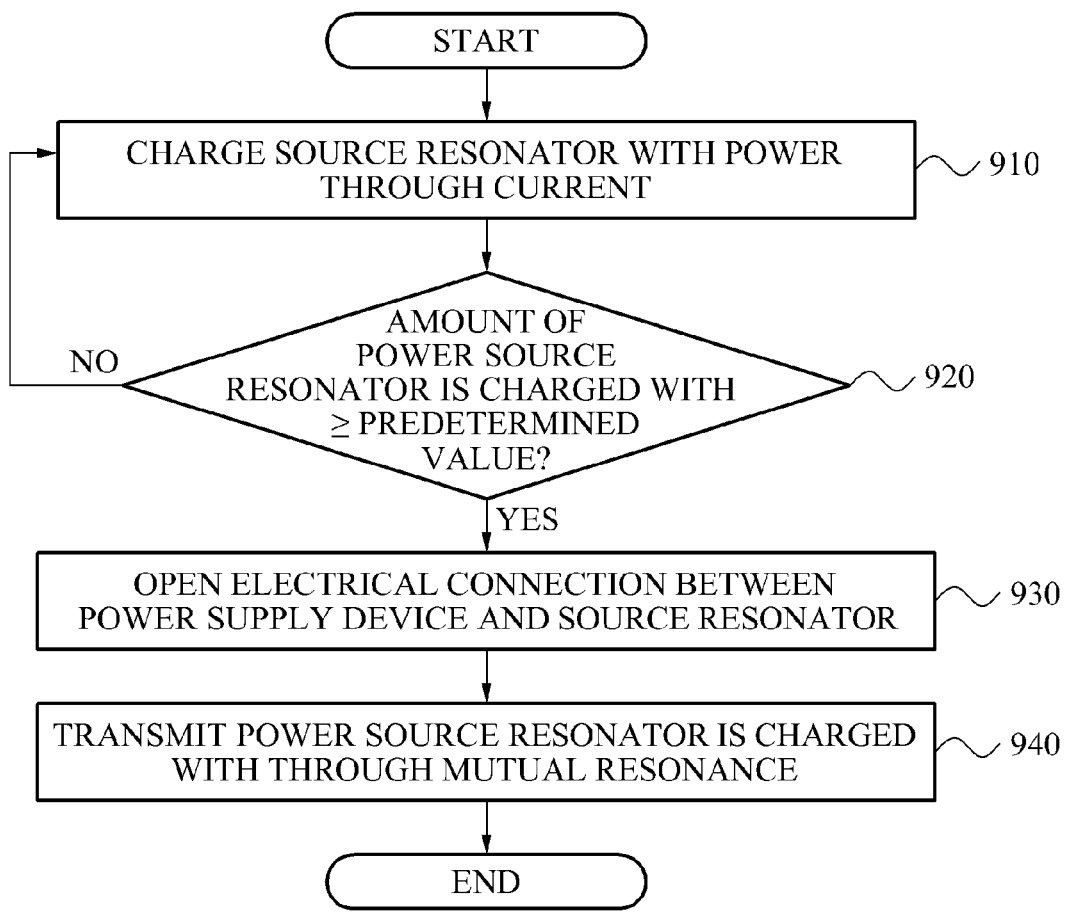
FIG. 9 is a flowchart illustrating an example of a method of transmitting wireless power.

FIG. 9 illustrates an example of a method of transmitting wireless power.

Referring to FIG. 9, in 910, a wireless power transmission device charges a source resonator with power provided from a power supply device through a current. The source resonator may include at least one capacitor and one inductor, and the wireless power transmission device may charge an inductor with power provided from the power supply device. The wireless power transmission device may quantize a level of power that the inductor is charged with by adjusting an amount of power provided from the power supply device.

In 920, the wireless power transmission device determines whether the source resonator is charged with power having an amount greater than or equal to a predetermined value. For example, the predetermined value may refer to a peak value of an amount of power the source resonator may be charged with, or a predetermined value used for a wireless power reception device. The wireless power transmission device may estimate the amount of power the source resonator may be charged with by detecting an envelope of a voltage applied to a capacitor. For example, the wireless power transmission device may determine whether an amount of power an inductor of the source resonator is charged with is greater than or equal to a predetermined value.

In 930, in response to the amount of power the source resonator is charged with being greater than or equal to a predetermined value, the wireless power transmission device opens an electrical connection by turning off a switch that connects the power supply device and the source resonator. As another example, if the amount of power the source resonator is charged with is less than a predetermined value, the switch remains off so as to continue charging the source resonator.

In 940, the wireless power transmission device transmits, to a target resonator, the power the source resonator is charged with, through mutual resonance between the source resonator and the target resonator. In response to the source resonator and the power supply device being isolated, an inductor and a capacitor of the source resonator may perform a resonance. For example, the source resonator and the target resonator may perform a mutual resonance according to a mutual inductance. In this instance, a resonant frequency of the source resonator matches a resonant frequency of the target resonator.

Figure 10:
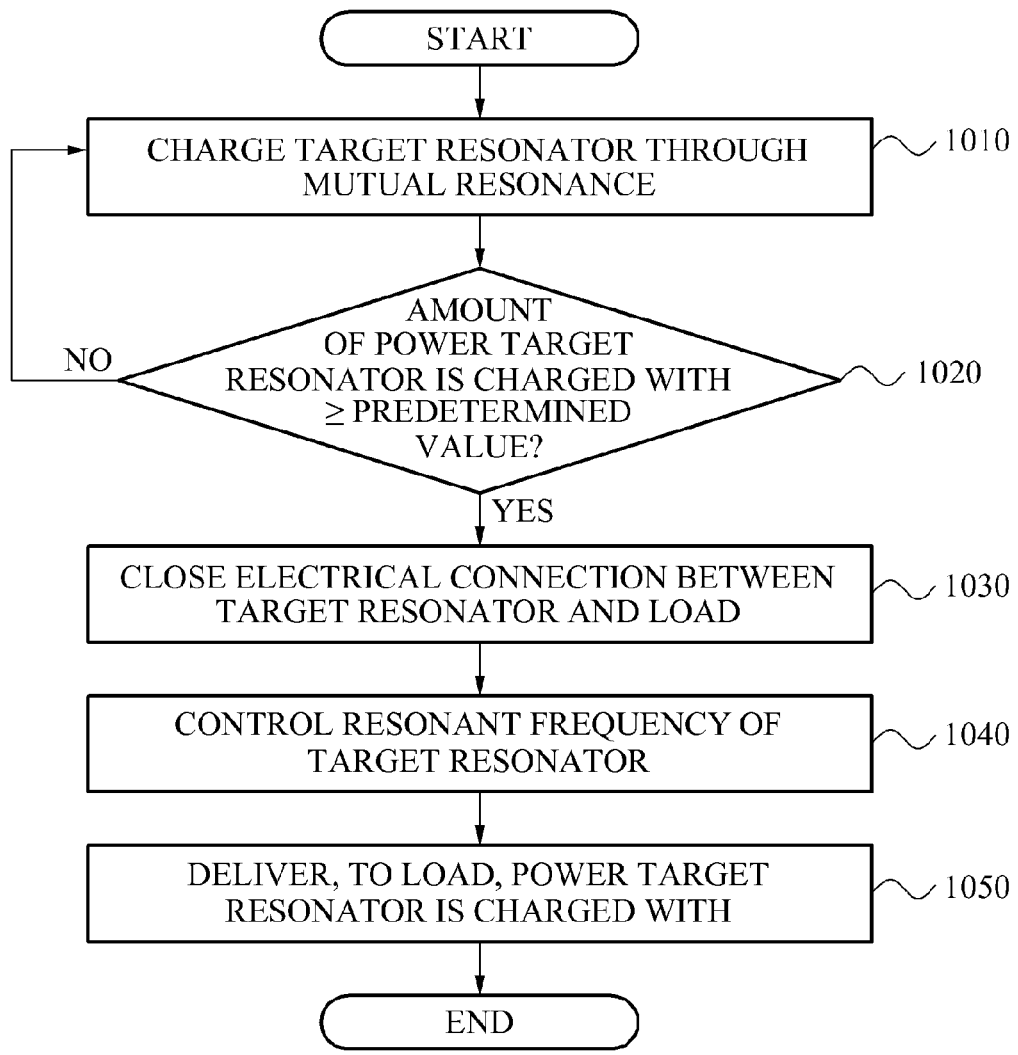
FIG. 10 is a flowchart illustrating an example of a method of receiving wireless power.

FIG. 10 illustrates an example of a method of receiving wireless power.

Referring to FIG. 10, in 1010, a wireless power reception device charges a target resonator with power through mutual resonance between the source resonator and the target resonator. For example, the target resonator may include at least one capacitor and one inductor, and the wireless power reception device may charge the at least one capacitor and one inductor through mutual resonance. The at least one capacitor and one inductor may be charged with energy delivered through the mutual resonance.

In 1020, the wireless power reception device determines whether the target resonator is charged with an amount of power greater than or equal to a predetermined value. If the target resonator is charged with an amount of power less than the predetermined value, the wireless power reception device continues to charge the target resonator. For example, the predetermined value may refer to a peak value of an amount of power the target resonator may be charged with. For example, the wireless power reception device may estimate the amount of power the target resonator is charged with by detecting an envelope of a voltage applied to a capacitor of the target resonator.

In 1030, if the target resonator is charged with an amount of power greater than or equal to the predetermined value, the wireless power reception device closes an electrical connection by turning on a switch that connects the target resonator and a load. On the other hand, if the target resonator is charged with an amount of power less than the predetermined value, the switch remains off.

In 1040, the wireless power reception device controls a resonant frequency between the source resonator and the target resonator. For example, the wireless power reception device may change a resonant frequency of the target resonator using a capacitor additionally connected to the target resonator.

In 1050, the wireless power reception device delivers, to the load, the power the target resonator is charged with. For example, the wireless power reception device may deliver the power according to a charging requirement of the load. For example, the charging requirement may correspond to a rated voltage and a rated current of the load, or an amount of power to be used. The wireless power reception device may deliver, to the load, the power the at least one capacitor and one inductor are charged with. The wireless power reception device may control a point of capturing energy stored in the target resonator by delivering, to the load, power an inductor as well as a capacitor is charged with.

Figure 11:
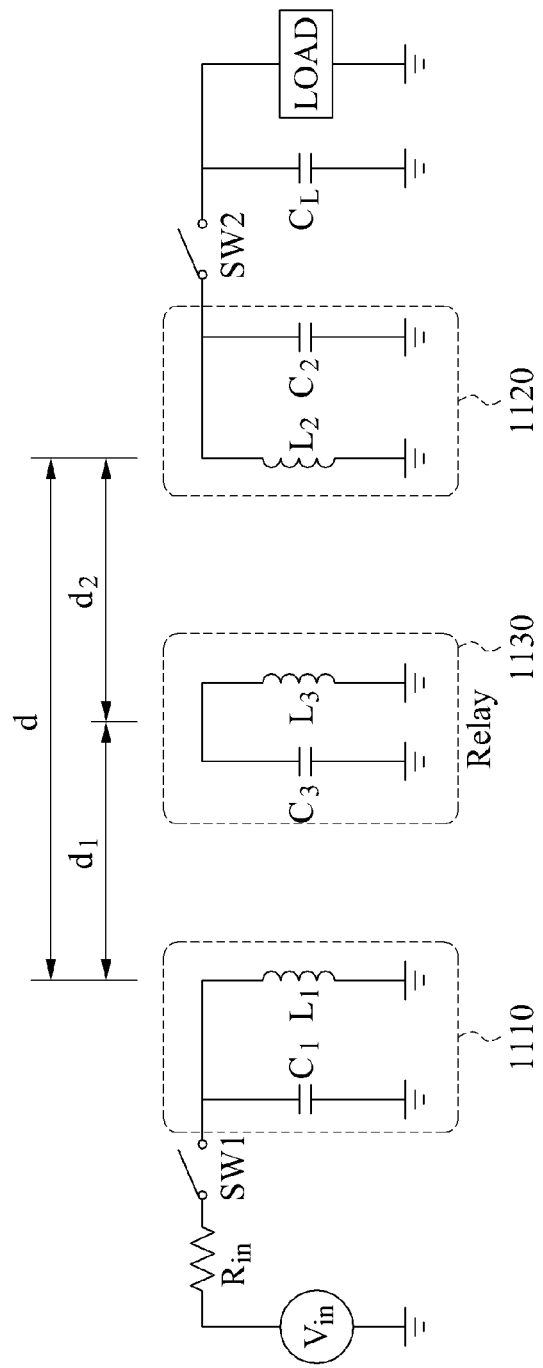
FIG. 11 is a diagram illustrating an example equivalent circuit of a wireless power transmission system.

FIG. 11 is a diagram illustrating an example equivalent circuit of a wireless power transmission system. More particularly, a wireless power transmission system of FIG. 11 has a configuration in which a relay resonator 1130 is added between a source resonator 1110 and a target resonator 1120 when compared to FIG. 4.

Referring to FIG. 11, the relay resonator 1130 is placed between the source resonator 1110 and the target resonator 1120, and increases a transmission efficiency of wireless power transmitted from the source resonator 1110 to the target resonator 1120.

The relay resonator 1130 may include a passive resonator. In this instance, "passive" may indicate that the relay resonator 1130 does not operate autonomously to enhance a transmission efficiency of wireless power. That is, energy is provided from the source resonator 1110 without a separate operating power source, and the provided energy is delivered to the target resonator 1120. The relay resonator 1130 may operate at the same resonant frequency as the source resonator 1110 and the target resonator 1120. For example, the relay resonator 1130 may include a capacitor $C_3$ and an inductor $L_3$.

A distance between the source resonator 1110 and the target resonator 1120 may correspond to d, a distance between the source resonator 1110 and the relay resonator 1130 may correspond to $d_1$, and a distance between the relay resonator 1130 and the target resonator 1120 may correspond to $d_2$.

The relay resonator 1130 may perform a function of a relay at any position between the source resonator 1110 and the target resonator 1120, and may efficiently perform a function of a relay when a distance to the source resonator 1110 equals a distance to the target resonator 1120. That is, when an equation $d_1=d_2=d/2$ is satisfied, the relay resonator 1130 may efficiently deliver power provided from the source resonator 1110 to the target resonator 1120.

A transmission efficiency of wireless power may be proportional to a coupling coefficient k between two resonators. In general, a coupling coefficient k between two resonators may be inversely proportion to a distance between the two resonators raised to an exponential value of three. That is, an equation $k=\alpha/d^3$ may be satisfied (here, a corresponds to a predetermined constant).

Thus, a distance relation $d_1=d_2=d/2$ among the source resonator 1110, the target resonator 1120, and the relay resonator 1130 may be replaced with a coupling coefficient relation $k_{13}=k_{23}=8*k_{12}$. In this instance, values 1, 2, and 3 of $k_{13}=k_{23}$ may indicate the source resonator 1110, the target resonator 1120, and the relay resonator 1130, respectively. For example, $k_{12}$ denotes a coupling coefficient between the source resonator 1110 and the target resonator 1120.

When three-resonator modeling in a near field is calculated using coupled mode theory (CMT), by substituting the coupling coefficient relation $k_{13}=k_{23}=8*k_{12}$, an equation related to a relay gain may be obtained, as shown below. The CMT may correspond to a model used in a field of physical optics, and may correspond to an approximating model for analyzing energy transmission between a plurality of resonators in a state of a weak mutual coupling. In this instance, k may be relatively small.

$$G_r = 0.91\exp\left(0.84\frac{\pi}{k_{12}Q}\right)$$

Here, $G_r$ denotes a relay gain, and Q denotes a quality factor of a resonator, and the three resonators are presumed to have the same Q.

Figure 12:
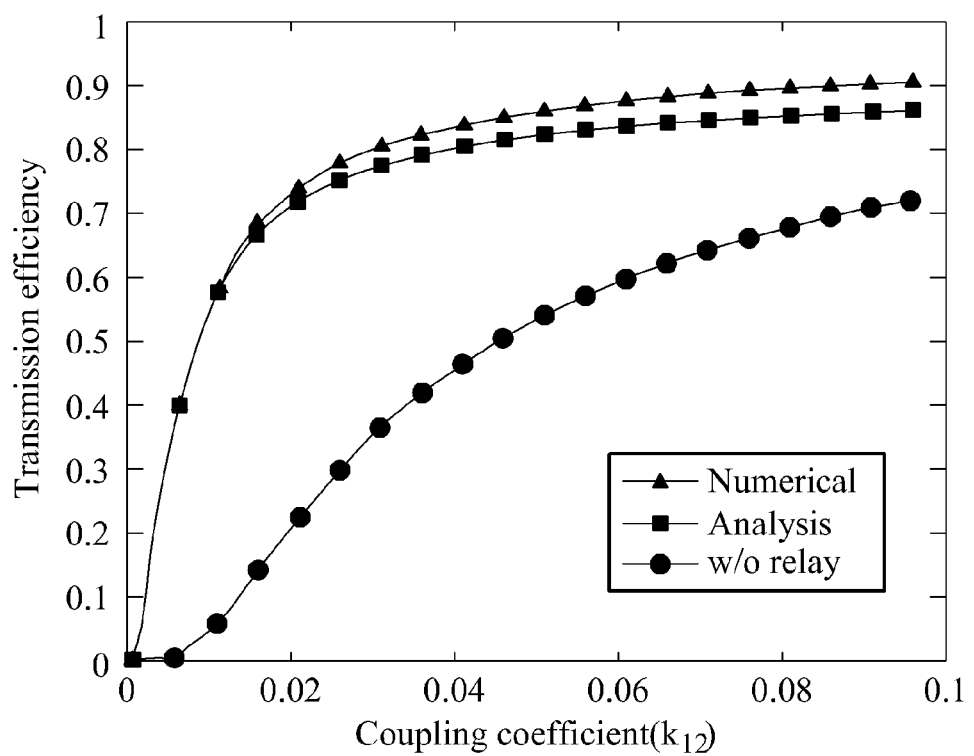
FIG. 12 is a graph illustrating an example of a transmission efficiency of wireless power in a wireless power transmission system.

FIG. 12 is a graph illustrating an example of a transmission efficiency of wireless power in a wireless power transmission system.

More particularly, FIG. 12 illustrates a graph indicating a transmission efficiency of wireless power transmitted from a source resonator to a target resonator through a relay resonator when $k_{12}$ is changed in the configuration of FIG. 11. For example, changing of $k_{12}$ may indicate an increase in the distance between the source resonator and the target resonator.

Referring to FIG. 12, terms "Numerical" and "Analysis" on the legend of the graph indicate a scheme of analyzing a transmission efficiency of wireless power using a CMT model when the relay resonator is included. Each depicts a closed form solution induced through a numerical analysis scheme or theory. Here, each closed form solution may indicate a transmission efficiency corresponding to each case where a coupling coefficient changes. As used in this example, "w/o relay" denotes a transmission efficiency between the source resonator and the target resonator when the relay resonator is excluded.

Referring to FIG. 12, an effect due to the relay resonator significantly increases as a coupling coefficient $k_{12}$ between the source resonator and the target resonator decreases. That is, enhancement of transmission efficiency by adding a relay resonator may increase as a physical distance between the source resonator and the target resonator increases. The relay resonator may have the same resonant frequency as the source resonator and the target resonator, and may be placed at a position where a distance to the source resonator is equal to a distance to the target resonator.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A wireless power transmission device, comprising:
    a power charger configured to receive power from a power supply device;
    a transmitter comprising a source resonator;
    a controller configured to control an electrical connection between the power charger and the transmitter to charge the source resonator with power by applying current to an inductor of the source resonator and to transmit the charged power to a target resonator through a mutual resonance;
    a measuring unit configured to measure a voltage applied to a capacitor of the source resonator; and
    a detector configured to detect an envelope of the voltage based on the measured voltage,
    wherein the controller is further configured to:
        open an electrical connection between the power supply device and the source resonator to prevent current from being provided to the source resonator from the power supply device upon the source resonator being charged with a value of power while the source resonator is transmitting power to the target resonator through mutual resonance,
        turn on a switch that electrically connects the power charger and the transmitter to charge the source resonator with power, and
        turn off the switch that electrically connects the power charger and the transmitter to transmit power the source resonator is charged with.

2. The wireless power transmission device of claim 1, wherein the power charger is configured to control an amount of current provided to the transmitter.

3. The wireless power transmission device of claim 1, wherein the power charger comprises a variable resistor that is connected, in series, to the power supply device.

4. The wireless power transmission device of claim 1, wherein the controller is configured to control the electrical connection between the power charger and the transmitter based on an amount of power that the source resonator is charged with.

5. The wireless power transmission device of claim 1, wherein the power charger comprises a plurality of resistors connected, in parallel, to the power supply device.

6. The wireless power transmission device of claim 1, further comprising a calculator configured to calculate energy stored in the source resonator based on the measured voltage and the measured current.

7. A wireless power reception device, comprising:
    a charger comprising a target resonator;
    a power output unit configured to transfer power to a load;
    a controller configured to open an electrical connection between the charger and the power output unit to charge the target resonator with power through mutual resonance with a source resonator, and to deliver the charged power to the load;
    a measuring unit configured to measure a voltage applied to a capacitor of the target resonator; and
    a detector configured to detect an envelope of the voltage based on the measured voltage,
    wherein the controller is further configured to:
        control an electrical connection between the target resonator and the load to prevent power from being delivered to the load from the target resonator upon the target resonator being charged with a value of power while charging the target resonator through mutual resonance with the source resonator,
        turn off a switch that electrically connects the charger and the power output unit while charging the target resonator with power, and
        turn on the switch that electrically connects the charger and the power output unit to deliver, to the load, power that the target resonator is charged with.

8. The wireless power reception device of claim 7, wherein the target resonator comprises at least one inductor.

9. The wireless power reception device of claim 8, wherein the power output unit is further configured to deliver power that the capacitor and the at least one inductor are charged with, to the load.

10. The wireless power reception device of claim 7, wherein the controller is configured to control the electrical connection between the charger and the power output unit based on an amount of power that the target resonator is charged with.

11. The wireless power reception device of claim 7, wherein the capacitor is configured to change a resonant frequency of the target resonator, in response to being electrically connected to the target resonator.

12. The wireless power reception device of claim 7, further comprising a calculator configured to calculate energy stored in the target resonator based on the measured voltage and the measured current.

13. The wireless power reception device of claim 7, wherein the load comprises a battery.

14. A method of transmitting wireless power, the method comprising:
    charging a source resonator with power provided from a power supply device by applying current to an inductor of the source resonator;
    controlling an electrical connection between the power supply device and the source resonator;
    transmitting, to a target resonator, the charged power through mutual resonance;
    measuring a voltage applied to a capacitor of the source resonator; and
    detecting an envelope of the voltage based on the measured voltage,
    wherein the controlling comprises:
        opening an electrical connection between the power supply device and the source resonator to prevent current from being provided to the source resonator from the power supply device upon the source resonator being charged with a value of power while the source resonator is transmitting power to the target resonator through mutual resonance;
        turning on a switch that electrically connects the power charger and the transmitter to charge the source resonator with power, and
        turning off the switch that electrically connects the power charger and the transmitter to transmit power the source resonator is charged with.

15. The method of claim 14, wherein the charging comprises adjusting an amount of current provided to the source resonator.

16. The method of claim 14, wherein the controlling comprises controlling an electrical connection between the power supply device and the source resonator based on an amount of power the source resonator is charged with.

17. A method of receiving wireless power, the method comprising:
 charging a target resonator with power that a source resonator is charged with, through mutual resonance between a source resonator and the target resonator;
 delivering, to a load, the power that the target resonator is charged with;
 measuring a voltage applied to a capacitor of the target resonator; and
 detecting an envelope of the voltage based on the measured voltage,
 wherein the charging comprises:
  opening an electrical connection between the target resonator and the load to prevent power from being delivered to the load from the target resonator upon the target resonator being charged with a value of power while charging the target resonator through mutual resonance with the source resonator,
  turning off a switch that electrically connects the charger and the power output unit while charging the target resonator with power, and
  turning on the switch that electrically connects the charger and the power output unit to deliver, to the load, power that the target resonator is charged with.

18. The method of claim 17, wherein the target resonator comprises an inductor.

19. The method of claim 18, wherein the delivering comprises delivering, to the load, power that the capacitor and the inductor are charged with.

20. The method of claim 17, further comprising:
controlling an electrical connection between the target resonator and the load based on an amount of power that the target resonator is charged with.

21. The method of claim 17, further comprising:
changing a resonant frequency of the target resonator using the capacitor.

22. A wireless power transmission device, comprising:
 a power charger configured to receive power from a power supply device;
 a transmitter comprising a source resonator; and
 a controller configured to control an electrical connection between the power charger and the transmitter to charge the source resonator with power by applying current to an inductor of the source resonator and to transmit the charged power to a target resonator through a mutual resonance;
 a measuring unit configured to measure a voltage applied to a capacitor of the source resonator; and
 a detector configured to detect an envelope of the voltage based on the measured voltage,
 wherein the controller is configured to:
  open the electrical connection between the power charger and the transmitter based on an amount of power with which the source resonator is charged,
  turn on a switch that electrically connects the power charger and the transmitter to charge the source resonator with power, and
  turn off the switch that electrically connects the power charger and the transmitter to transmit power the source resonator is charged with.

23. The wireless power transmission device of claim 1, wherein the value of power corresponds to a peak value of energy to be charged in the source resonator.

* * * * *